US008050309B2

(12) United States Patent
Schweikert et al.

(10) Patent No.: US 8,050,309 B2
(45) Date of Patent: Nov. 1, 2011

(54) MULTIPATH DISCRIMINATOR MODULE FOR A NAVIGATION SYSTEM

(75) Inventors: Robert Schweikert, Seefeld (DE); Thomas Worz, Munich (DE)

(73) Assignee: Agence Spatiale Europeenne, Paris (FR)

(*) Notice: Subject to any disclaimer, the term of this patent is extended or adjusted under 35 U.S.C. 154(b) by 2270 days.

(21) Appl. No.: 10/480,610

(22) PCT Filed: Jun. 19, 2002

(86) PCT No.: PCT/FR02/02109

§ 371 (c)(1),
(2), (4) Date: Jun. 14, 2004

(87) PCT Pub. No.: WO03/003603

PCT Pub. Date: Jan. 9, 2003

(65) Prior Publication Data

US 2004/0240530 A1     Dec. 2, 2004

(30) Foreign Application Priority Data

Jun. 25, 2001   (FR) ..................................... 01 08363

(51) Int. Cl.
*H04B 1/69*     (2011.01)

(52) U.S. Cl. ........ 375/130; 375/150; 375/355; 375/222; 375/227; 375/142; 370/515; 370/503

(58) Field of Classification Search .................. 375/150, 375/355, 130, 143, 222, 227; 370/515, 503
See application file for complete search history.

(56) References Cited

U.S. PATENT DOCUMENTS

| 6,236,673 | B1 | 5/2001 | Jülg | |
|---|---|---|---|---|
| 6,735,242 | B1* | 5/2004 | Kenney et al. | 375/150 |
| 7,508,865 | B2* | 3/2009 | Miller et al. | 375/150 |
| 7,817,760 | B2* | 10/2010 | Black et al. | 375/355 |

OTHER PUBLICATIONS

Gaudenzi et al., "A Digital Chip Timing Recovery Loop for Band-Limited Direct-Sequence Spread-Spectrum Signals", *IEEE Transactions on Communications*, vol. 41, No. 11 (Nov. 1, 1993).

* cited by examiner

*Primary Examiner* — Eva Puente
(74) *Attorney, Agent, or Firm* — Alston & Bird LLP

(57) ABSTRACT

A multipath discriminator module and related methods are provided for communications and/or navigation systems that implement spread spectrum modulation. In one example embodiment, the module includes an input suitable for receiving navigation signals, a sampler for supplying sampled signals at a frequency twice the apparent frequency of the code of the signals, and a submodule for calculating an error signal from the sampled signals.

8 Claims, 3 Drawing Sheets

MULTIPATH DISCRIMINATOR MODULE FOR A NAVIGATION SYSTEM

The invention relates to a multipath discriminator module for a navigation system, and also to a navigation system including such a module.

BACKGROUND OF THE INVENTION

Over the last ten years, direct sequence and spread spectrum (DS-SS) modulation systems have been increasing in importance.

At present, this technique is implemented not only in satellite navigation systems such as GPS and GLONASS, but it has also been introduced into terrestrial and satellite communications systems, e.g. US standard IS-95, GLOBALSTAR, and more recently in the third generation of mobile telephones using the UMTS standard, and also in the European satellite navigation system GALILEO.

The concept of DS-SS modulation, e.g. bi-binary phase shift keying (Bi-BPSK) introduces a pseudo-random noise (PRN) code which has the consequence of the resulting modulated signal presenting a passband that is wider than a signal that is transmitting only the data signals. It is in this sense that the spectrum density of the signal is said to be "spread".

In the receiver, a locally-generated replica of the transmitted PRN code is aligned with the phase of the code of the received signal. In particular, in navigation receivers, code phase alignment is essential for determining accurately the time of arrival (TOA), which is used for determining the geometrical distance between the transmitter and the receiver. Once alignment has been achieved, it is possible to estimate carrier phase and to determine the symbols of the transmitted data.

This alignment is conventionally achieved in the receiver by means of a delay-locked loop (DLL), an example of which is described in the article by M. Simon et al. published in the work "Spread spectrum communications handbook" published by McGrawHill, Inc., 2nd edition, 1994.

Such alignment uses the result of correlation between the received signal and early and late versions (E and L) of a locally-generated reference code signal in order to calculate an error signal that is proportional to code phase error (the difference between the estimated code phase and the received phase).

This error signal must indicate the direction in which the phase of the reference signal needs to be offset (advanced or retarded) in order to be brought into synchronization with the received signal. The spacing between the early and late codes (E and L) is generally one bit of a pseudo-noise sequence known as a "chip".

Signals of the square-root raised cosine (SRC) type (which have a raised cosine spectrum) are defined in the UMTS standard. The same type of SRC signal is likely also to be adopted in the above-mentioned GALILEO system. A digital receiver implementing such signals is described in the article by R. de Gaudezni et al. entitled "A digital chip timing recovery loop for band-limited direct-sequence spread-spectrum signals" published in IEEE Trans. on Comm., Vol. 41, No. 11, pp. 1760-1769, November 1993.

The accuracy with which time of arrival is measured is negatively disturbed by the presence of distortion due to multiple paths, and as a result, when performing telemetry, the precision with which position is determined is decreased, and when transmitting data, there is an increase in bit or frame error rate. This is particularly true when the multipath distortion is represented essentially by a single reflection coming from a point which is situated in the immediate environment of the receiver with a small dynamic range.

The superposition of the direct and reflected signals is thus liable to give rise to jitter which affects the TOA measurements performed by the DLL.

As a result, techniques that make it possible to reduce the impact of multiple paths on determining code phase are of very great interest, particularly in the field of navigation.

Until now, methods for compensating multiple paths for use in telemetry have been developed essentially in the context of GPS receivers.

As a result, a large number of those algorithms make use of the fact that the apparent chip rate of the publically available C/A code is much lower than the passband of the transmission. It is then advantageous to reduce the time differences between the early and late reference code signals E and L until they have a value that is less than one bit of a pseudo-random noise sequence ("one chip duration") in order to reduce the error that is induced by the multipath beams.

In the context of SRC type systems, given that the frequency spectrum is strictly limited to $(1+\beta)$ times the apparent code rate (where $\beta$ designates the attenuation factor of SRC pulses), the above-mentioned methods are not effective in compensating multipath beams.

In the article by Philip G. Mattos entitled "Multipath elimination for the low-cost consumer GPS" published in the Proceedings of the ION GPS 1996 Conference in Kansas City, pp. 665-671, it has also been suggested to replace the early and late correlation points E and L by two early correlation points. However, that article does not give any means for implementing that technique.

OBJECTS AND SUMMARY OF THE INVENTION

An object of the present invention is to provide a discriminator module which is suitable for use in a spread spectrum communications or navigation system, and more particularly one using SRC type modulation.

In a first variant, the invention provides a multipath discriminator module for a communications and/or navigation system that implements spread spectrum modulation, which module has an input suitable for receiving navigation signals, a sampler for supplying sampled signals at a frequency twice the apparent frequency fc of the code of said signals, and a submodule for calculating an error signal $e_k$ from said sampled signals, and a locally generated spreading code C|K|L wherein:

$$e_k = K_\beta \; \mathrm{R}\left(\frac{Z_K^{--}}{Z_K^{-}} + S\beta\right)$$

with 
$$\begin{cases} Z_K^{--} = [r_{k-t2} \cdot C_{|K|L}] \otimes h_k^p \\ Z_K^{-} = [r_{k-t1} \cdot C_{|K|L}] \otimes h_k^p \end{cases}$$

or 
$$\begin{cases} Z_K^{--} = [r_k \cdot C_{|K-t2|L}] \otimes h_k^p \\ Z_K^{-} = [r_k \cdot C_{|K-t1|L}] \otimes h_k^p \end{cases}$$

$K_\beta$ = constant and $$S_\beta = -\frac{g(-t1Tc)}{g(-t2Tc)} \quad \text{with}$$

$$g(aTc) = \frac{\text{Sin}\Pi\alpha\text{Cos}\Pi\beta\alpha}{\pi\alpha[1-(2\beta a)]}$$

β designating the attenuation factor of the SRC signal.

In a second variant, the invention provides a multipath discriminator module for a communications and/or navigation system that implements spread spectrum modulation, which module has an input suitable for receiving navigation signals, a sampler for supplying sampled signals at a frequency twice the apparent frequency fc of the code of said signals, and a submodule for calculating an error signal $e_k$ from said sampled signals, and a locally generated spreading code C|K|L wherein:

$$e_k = K_\beta \left( -\frac{Z_K^{--}}{Z_K^{-}} + S\beta \right)$$

$$\text{with } \begin{cases} Z_K^{--} = [r_{k-t2} \cdot C_{|K|L}] \otimes h_k^b \\ Z_K^{-} = [r_{k-t1} \cdot C_{|K|L}] \otimes h_k^b \end{cases}$$

$$\text{or } \begin{cases} Z_K^{--} = [r_k \cdot C_{|K-t2|L}] \otimes h_k^b \\ Z_K^{-} = [r_k \cdot C_{|K-t1|L}] \otimes h_k^b \end{cases}$$

$K_\beta$ = constant and $$S_\beta = \frac{g(-t1Tc)}{g(-t2Tc)} \text{ with }$$

$$g(aTc) = \frac{\text{Sin}\Pi\alpha\text{Cos}\Pi\beta\alpha}{\pi\alpha[1-(2\beta a)]}$$

β designating the attenuation factor of the SRC signal.

In a third variant, the invention provides a multipath discriminator module for a communications and/or navigation system that implements spread spectrum modulation, which module has an input suitable for receiving navigation signals, a sampler for supplying sampled signals at a frequency twice the apparent frequency fc of the code of said signals, and a submodule for calculating an error signal $e_k$ from said sampled signals, and a locally generated spreading code C|K|L wherein:

$$e_k = K_\beta \, \mathcal{R}\left( 2\frac{Z_K^{--}}{Z_K^{-} + Z_K^{+}} + S_\beta \right)$$

$$\text{with } \begin{cases} Z_K^{+} = [r_{k+0.5} \cdot C_{|K|L}] \otimes h_k^b \\ Z_K^{--} = [r_{k-t2} \cdot C_{|K|L}] \otimes h_k^b \\ Z_K^{-} = [r_{kt-t1} \cdot C_{|K|L}] \otimes h_k^b \end{cases}$$

$$\text{or } \begin{cases} Z_K^{+} = [r_k \cdot C_{|k+1/2|L}] \otimes h_k^b \\ Z_K^{--} = [r_k \cdot C_{(k-t2)L}] \otimes h_k^b \\ Z_K^{-} = [r_k \cdot C_{(k-t1)L}] \otimes h_k^b \end{cases}$$

β = constant and $$S_\beta = -\frac{g(-t1Tc)}{g(-t2Tc)} \text{ with }$$

$$g(aTc) = \frac{\text{Sin}\Pi\alpha\text{Cos}\Pi\beta\alpha}{\pi\alpha[1-(2\beta a)]}$$

β designating the attenuation factor of the SRC signal.

In each of the above cases, $h_k^b$ designates the impulse response of a lowpass filter.

The discriminator module may be such that:

$$K\beta = \frac{1}{\dfrac{d}{d\varepsilon}\left(\dfrac{g((\varepsilon-t1)Tc)}{g((\varepsilon-t2)Tc)}\right)_{\varepsilon=0}}$$

In each of the three above variants, it is possible to have t1=1.5 and t2=0.5.

The invention also provides a multipath discriminator module for a communications and/or navigation system that implements spread spectrum modulation, which module has an input suitable for receiving navigation signals, a sampler for supplying sampled signals at a frequency twice the apparent frequency fc of the code of said signals, and a submodule for calculating an error signal $e_k$ from said sampled signals, and a locally generated spreading code C|K|L wherein the submodule calculates the real portion of a ratio of two advance correlation values relative to the real phase value, these values coming from correlation between the received signal and the locally generated reference signal.

The invention also provides a navigation system, presenting a discriminator module as defined above.

Finally, the invention provides a navigation system, presenting a discriminator module generating an error signal $e'_k$ serving in conventional manner to correct a closed loop on the basis of sampled signal $Z+_K$ and $Z-_K$ which is associated with a discriminator module as defined above in order to operate in an open loop on a said error signal $e_k$ to generate a correction signal for the code phase output.

BRIEF DESCRIPTION OF THE DRAWINGS

Other characteristics and advantages of the invention appear better on reading the following description given by way of non-limiting example and with reference to the accompanying drawings, in which.

MORE DETAILED DESCRIPTION

Formula 3-1 represents a direct sequence spread spectrum (DS-SS) signal $s_T(t)$ in baseband, with the spreading code word having a length of 2 pseudo-noise sequence bits (or "chips"), and each data symbol dp,q,i presenting M/L distributed code words:

$$S_T(t) = \sqrt{\alpha \cdot P_s} \cdot \sum_{i=-\infty}^{\infty} \left( d_{P \cdot [i]_M} \cdot c_{P \cdot [i]_L} + j \cdot b \cdot d_{Q \cdot [i]_M} \cdot c_{Q \cdot [i]_L} \right) \cdot \quad (3\text{-}1)$$

$$g_T(t - iT_c)$$

The factors a and b are as follows in the following circumstances:
a=1.0 and b=0 BPSK DS-SS
a=0.5 and b=1, with $d_{P,|i|_M}=d_{Q,|i|_M}$ QPN DS-SS
a=0.5 and b=1, with $d_{P,|i|_M}=d_{Q,|i|_M}$ Bi-BPSK DS-SS
with:
Ps: transmitted power
$d_{P/Q,i}$ data symbols ($d_{P/Q,i \in [-1,1]}$)
$C_{P/Q,i}$ bit ("chip") of a spreading code word of length L ($C_{P/Q,i \in [-1,1]}$)
$T_c=1/f_c$ duration of one bit of a pseudo-noise sequence (or duration of one "chip")
$g_T(t)$ pulse shape of a bit or "chip" e.g. SRC
M data symbol length in the duration of one bit or "chip"
$|i|_M$ int(i/M)
$|i|_M$ imodM After transmission by a channel with added white Gaussian noise (AWGN) presenting symmetrical spectrum density $N_{o/2}$, the filtered received signal r(t) is given by formula (3-2).

$$r(t) = S_T(t-\tau) \otimes g_r(t) \qquad (3\text{-}2)$$

$$= \sqrt{a \cdot P_s} \cdot \sum_{i=-\infty}^{\infty} (d_{P,|i|_M} \cdot c_{P,|i|_L} + j \cdot b \cdot d_{Q,|i|_M} \cdot C_{Q,|i|_L}) \cdot$$

$$g(t - \tau - iT_c) \cdot \exp(j(\Delta\omega(t) + \phi(t))) + n(t)$$

$g(t)=g_T(t) \otimes g_T(t)$ designating the pulse shape of one bit or "chip" after filtering and $\otimes$ designating convolution.

g(t) thus constitutes the autocorrelation function of $g_T(t)$.

$\Delta\omega(t)$ designates the residual difference of the carrier frequency after the signal has been mixed into baseband.

$\phi(t)$ designates the phase of the carrier phase of the received signal.

Because of the similarity between the in-phase and quadrature components of the signal given by formula 3-2, it is appropriate to conserve only the in-phase component below. As a result, the symbols p,q designating these two situations are not conserved, in order to make the notation more readable.

Formula 3-2 thus becomes:

$$r(t) = \sqrt{P_s} \cdot \sum_{i=-\infty}^{\infty} d_{|i|_M} \cdot c_{|i|_L} \cdot g(t - \tau - iT_c) \cdot \qquad (3\text{-}3)$$

$$\exp(j(\Delta\omega(t) + \phi(t))) + n(t)$$

for a system of the BPSK DS-SS type, for example.

Figure 1:
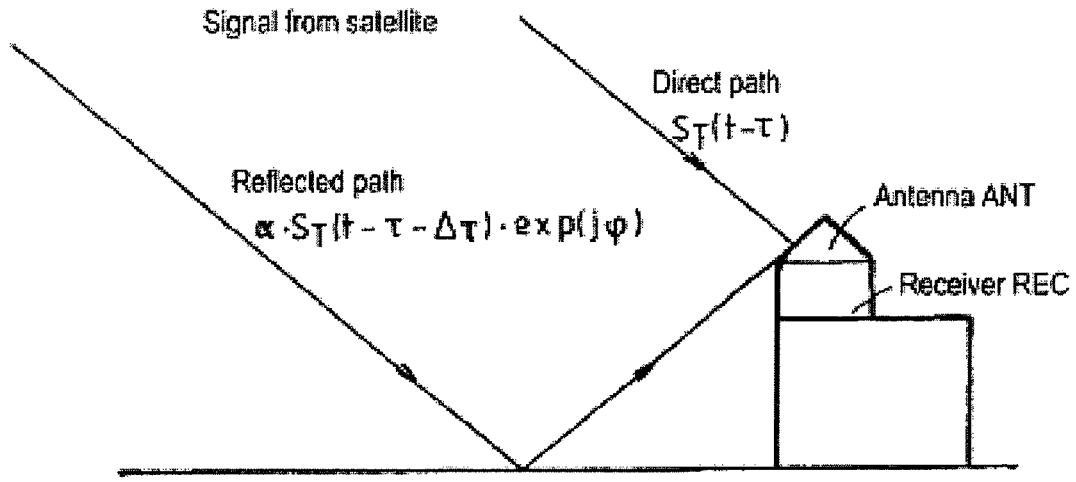
FIG. 1 shows the influence of a multipath signal comprising a direct path and at least one reflected path.

FIG. 1 is a model of multiple paths that is suitable for use in showing the effect of multiple paths on the DLL. In addition to the direct signal coming from the satellite, the antenna also receives a delayed second version of the same signal, referred to as the multipath component and due to reflection, with the delay in this second signal coming from the fact that it has had to follow a path that is longer.

The sum of these two signals as received by the antenna can be expressed using the following formula:

$$S'_T(t)=S_T(t-\tau)+\alpha \cdot S_T(t-\tau-\Delta\tau) \cdot \exp(j\phi) \qquad (3\text{-}4)$$

with
α: attenuation of the reflected signal relative to the direct signal
Δτ: delay of the reflected signal relative to the direct signal φ=2π·Δτ·fc/c: the phase offset of the carrier of the reflected signal relative to the direct signal (c=speed of light, fc=carrier frequency).

After filtering (see formulae 3-2 and 3-3), the following is obtained:

$$r(t)=r(t)+\alpha \cdot r(t-\Delta\tau) \cdot \exp(j\phi) \qquad (3\text{-}5)$$

The explanation is given taking account of one reflection only. In practice, there are several components corresponding to multiple reflection paths which are all superposed on the direct signal.

The above-mentioned document by R. de Gaudenzi et al. uses a DLL of architecture outlined below, when describing FIG. 2.

It should be observed:
that the analog-to-digital converter could be located at a different location; and
that the time offset for aligning the local reference signal with the received signal may be applied either to the local reference signal or to the received signal.

The baseband signal r(t) obtained by filtering using a filter of characteristic $G_T(f)$ is sampled at twice the bit or "chip" frequency, i.e. at 2 fc. The samples that correspond to half-integer instants $(k+0.5) Tc+\tau$ are directed to the DLL, whereas the other samples corresponding to "integer" instants $kTc+\tau$ are directed to instantaneous correlation and tracking of carrier phase and data demodulation (circuit NCO).

The samples corresponding to half-integer instants are given by:

$$r_k + 1/2 = \sqrt{P_S} \cdot \exp(j\phi) \cdot \sum_{i=-\infty}^{\infty} d_{|i|_M} \cdot c_{|i|_L} \cdot \qquad (3\text{-}6)$$

$$g((\varepsilon_k + k + 1/2 - i)T_c) \cdot + n_{k+1/2}$$

These samples $r_{k+1/2}$ are directed along two branches. In the upper branch (FIG. 2), the samples are delayed by one bit or "chip" Tc prior to being multiplied by the $k^{th}$ value of the spreading code $C_{|k|_L}$ as locally generated by the spreading code generator SCGEN. This multiplication is followed in each of the branches by a lowpass filter $H^b(z)$.

This produces the following samples:

$$Z_k^+ = [r_k + 1/2 \cdot c|k|_L] \otimes h_k^b \qquad (3\text{-}7)$$

$$Z_k^- = [r_k - 1/2 \cdot c|k|_L] \otimes h_k^b$$

where:
$h_k^b$ designates the impulse response of the lowpass filter. The passband of this filter is limited in practice on the low side by:
the rate $f_s$ ($f_s=f_c/M$) of data symbols, otherwise useful energy is lost; or
the dynamic range between the transmitter and the receiver, the distance between the transmitter and the receiver is assumed to be constant relative to the passband of $H^b(z)$.

The error signal $e_k$ is generated as follows:

$$e_k=|z_k^-|^2-|z_k^+|^2 \qquad (3\text{-}8)$$

In order to obtain an error signal that can be used directly by the operational circuit NCO, the signal $e_k$ is generally filtered by another digital filter, the loop filter, whose transfer function is $H^d(z)$. Given that $e_k$ is independent of the data symbols, the characteristics of $H^d(z)$ are determined mainly by the response desired of the DLL to the dynamic range between the transmitter and the receiver, the phase estimator loop needing to be capable of tracking a linear distance between the transmitter and the receiver that is increasing or decreasing, without any residual tracking error.

The characteristic $n(\epsilon)$ indicates how the error signal $e_k$ depends on the code phase error $\epsilon$.

$$n(\epsilon)=E[e_k|\epsilon_k=\epsilon \forall k] \quad (3.9)$$

E [•] designating probability.
This gives:

$$n(\epsilon)=g^2[(\epsilon-0.5)T_c]-g^2[(\epsilon+0.5)T_c] \quad (3.10)$$

with SRC coding having an attenuation factor $\beta$, $g(\epsilon T_c)$ becomes:

$$g(\epsilon T_c) = \frac{\sin(\Pi \epsilon)}{\pi \epsilon} \cdot \frac{\cos(\pi \beta \epsilon)}{1-(2\beta \epsilon)^2}$$

Figure 3A:
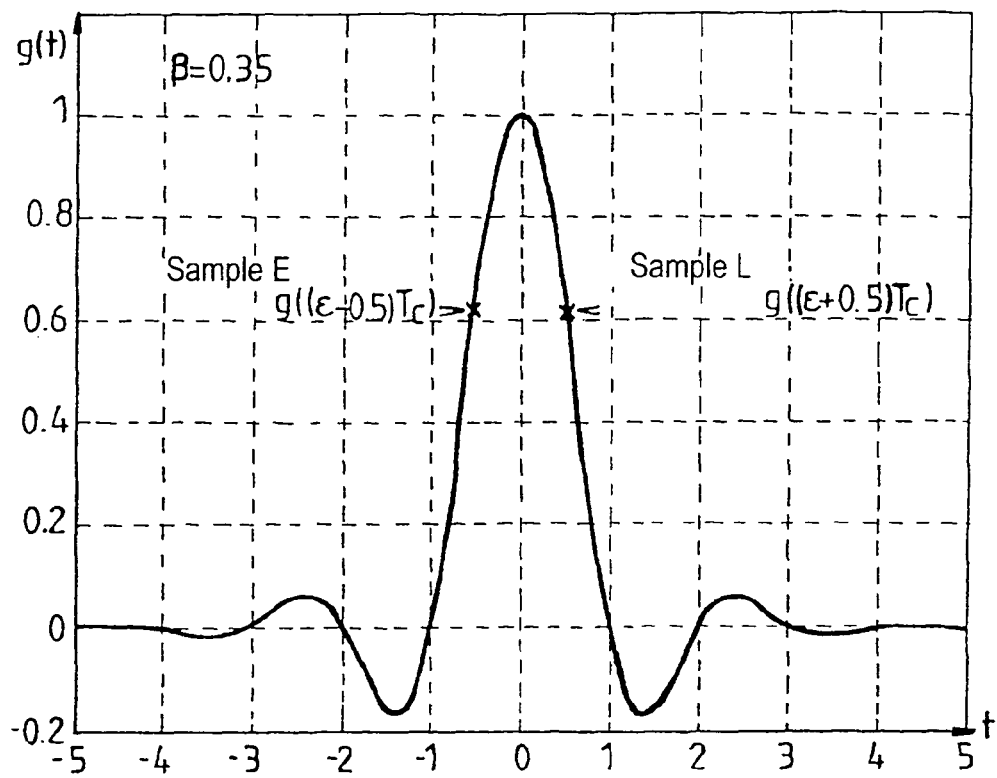
FIGS. 3a and 3b are graphs plotting the autocorrelation function g(t) respectively for a module in accordance with FIG. 2 and in accordance with the invention.

The autocorrelation function $g(\epsilon T_c)$ with $\beta=0.35$ is shown in FIG. 3a. The early and late samples E and L of formula (3-8) are given for $\epsilon=0$ (no code phase error).

According to formula (3-10), the resulting S-shaped curve is shown in FIG. 3a. Using this curve, the DLL controls the interpolator so that the received signal is in alignment with the locally-generated signal (i.e. $\epsilon=0$).

The discriminator of the invention (FIG. 4) implements two early samples $E1(Z_k^-)$ and $E2(Z_k^{--})$ at instants $(\epsilon-t_1)T_c$ and $(\epsilon-t_2)T_c$, generated using the formula:

$$e_k = \kappa_\beta \cdot \mathcal{R}\left(\frac{Zk^{--}}{Zk^-} + S_\beta\right) \quad (\text{see}(3\text{-}7))$$

· $\mathcal{R}(\bullet)$ designating the real portion

· $K_\beta$ is a constant

· $S_\beta$ is an offset

· the two samples $E2$ and $E1$ are defined by:

$$Z_k^- = \lfloor r_{k-t2} \cdot C_{P,|K|L} \rfloor \otimes h_k^b \text{ et } Z_k^{--} = \lfloor r_{k-t1} \cdot C_{P,|K|L} \rfloor \otimes h_k^b$$

with, for example, $t_1=1.5$ and $t_2=0.5$.

It is also possible to generate these two samples by declaring the local replica of the code using the formula:

$$Z_K^- = \lfloor r_k \cdot C_{P,|(k-t_2)|L} \rfloor \otimes h_k^b$$

and $$Z_K^{--} = \lfloor r_k \cdot C_{P,|(k-t_1)|L} \rfloor \otimes h_k^b$$

The offset should be selected so that the expected value of the error signal $E[e_k]$ is zero when the code phase error $\epsilon_k$ is zero.

Applying formula (3-12), this gives:

$$E\left[\mathcal{R}\left(\frac{Z_k^-}{Z_k^-}+S_\beta\right)|\epsilon_k=0\right] \equiv 0 \Rightarrow S_\beta = E\left[-\mathcal{R}\left(\frac{Z_k^-}{Z_k^-}\right)|\epsilon_k=0\right] = \quad (3\text{-}13)$$

$$-\frac{g(-t1Tc)}{g(-t2Tc)}$$

The slope factor $K_\beta$ is preferably selected so that the value of the slope:

$$E\left[\frac{d}{d\epsilon}e_k|\epsilon_k|=0\right]$$

is equal to 1 when $\epsilon_K=0$
This gives:

$$K_\beta = \frac{1}{E\left[\frac{d}{d\epsilon}\mathcal{R}\left(\frac{Z_K^-}{Z_K^-}+S_\beta\right)|\epsilon_k=0\right]} = \frac{1}{\frac{d}{d\epsilon}\left(\frac{g((\epsilon-t_1)Tc)}{g((\epsilon-t2)Tc)}\right)\epsilon=0} \quad (3.14)$$

for example with $t_1=1.5$ and $t_2=0.5$.

As shown by formula (3-12), the discriminator $e_K$ of the invention is independent of the phase $\Phi$ of the carrier. This dependence is eliminated by generating the ratio $Z_K^{--}/Z_K^-$.

Figure 3B:
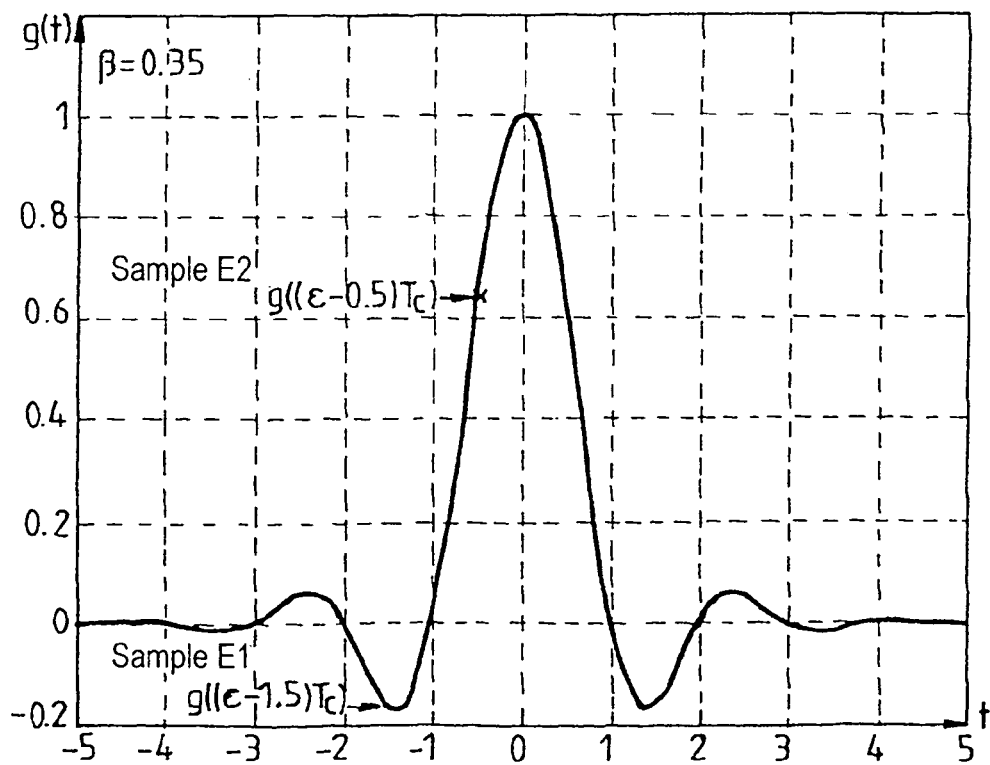

The autocorrelation function $g(t)$ for $\beta=0.35$ is given in FIG. 3b.

The discriminator module can be used in two ways:
- either it can be used directly to replace a known discriminator;
- or else it can be integrated in a known discriminator in order to provide open loop correction signals to reduce the induced multipath error.

Figure 4:
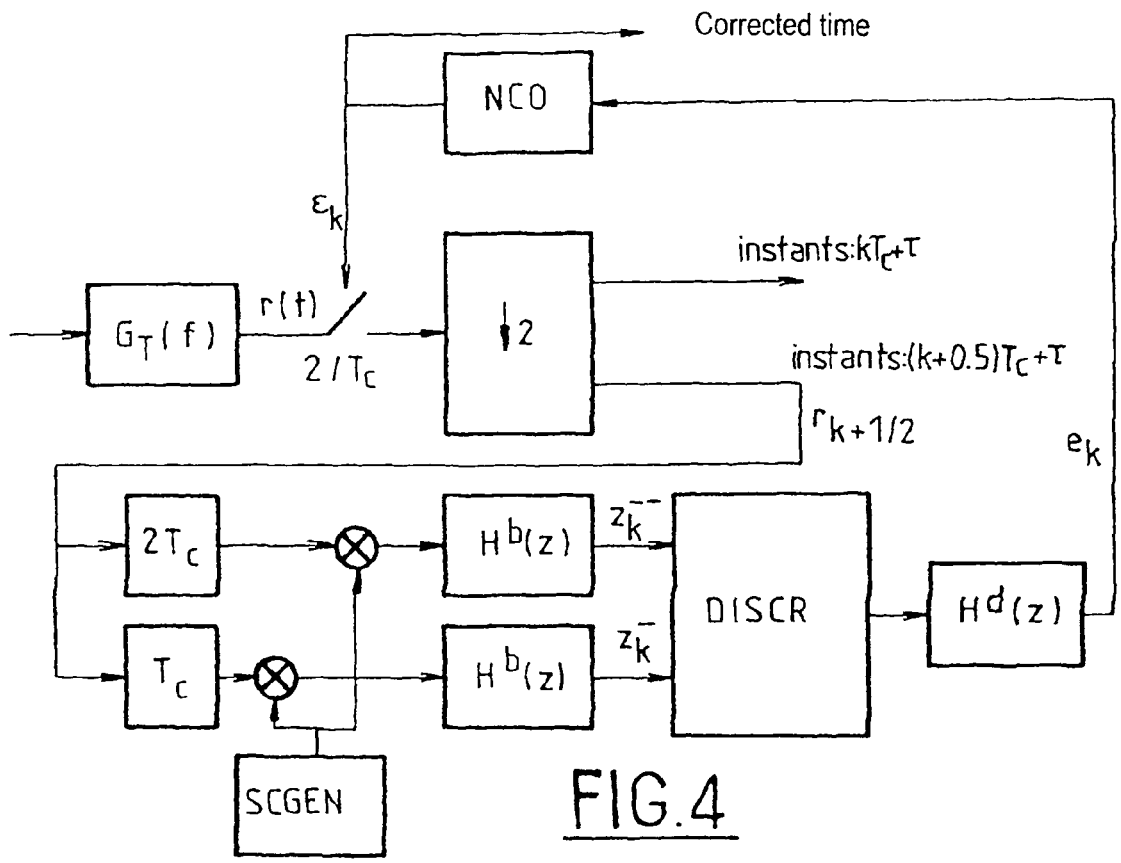
FIG. 4 is a block diagram of a DLL incorporating a discriminator of the invention.

FIG. 4 is a block diagram of a DLL branch including a discriminator module of the invention.

Figure 2:
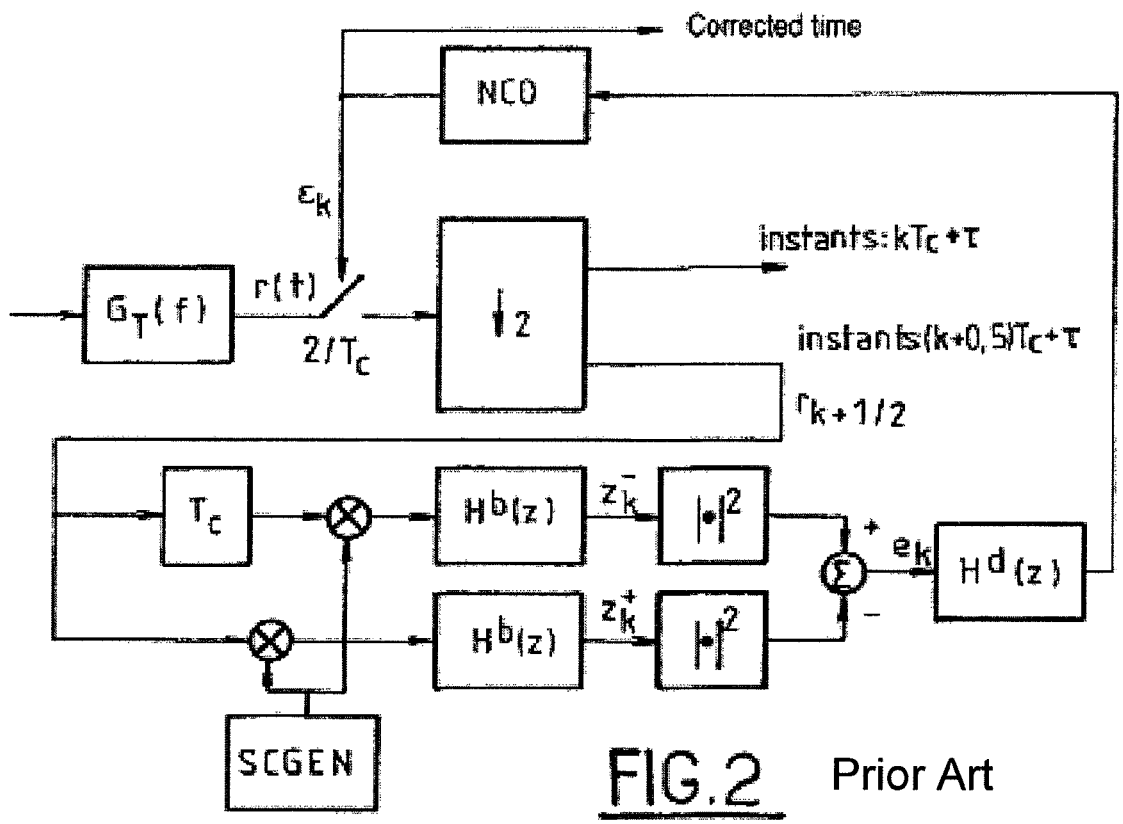
FIG. 2 is a block diagram of a DLL as described in the above-mentioned article by R. de Gaudenzi et al.

Comparing FIGS. 2 and 4, it can be seen that:
- the branch which generated $z_k$ in FIG. 2 is replaced by a branch which generates $z_k^{--}$ with a delay element of duration $2T_c$;
- the error signal $e_k$ is calculated as a function of $z_k$ in the circuit DISCR using formula (3-12) corresponding to the module of the invention.

For a signal of SRC type, the S-shaped curve $n(\epsilon)$ is given by:

$$n(\epsilon)\kappa\beta \cdot \mathcal{R}\left(\frac{g((\epsilon-t_1)T_c)}{g((\epsilon-t_2)T_c)}+S_\beta\right) \quad (3\text{-}15)$$

with $$g(\epsilon T_c) = \frac{\sin(\pi \epsilon)}{\pi \epsilon} \cdot \frac{\cos(\pi \beta \epsilon)}{1-(2\beta \epsilon)^2}$$

with for example $t1=1.5$ and $t2=0.5$

The discriminator module corresponds to the desired behavior to within a good approximation, i.e. the output of the S-shaped curve is proportional to the input e ($e=K.\epsilon$) for $-0.5\epsilon \leq 0.5$.

By selecting $K_\beta$ in application of formula (3-14) $K=1$ and $e=\epsilon$.

The discriminator module can be used to perform open loop estimation to correct the code phase output of a conventional module, as shown in FIG. 4.

Compared with the FIG. 4 module, there is an additional branch having a delay element $2Tc$ in order to generate the signal $Z_K^{--}$.

A digital filter $H_{com}^d(z)$ can be used as the lowpass filter at the output from the new discriminator module. The operation of the DLL branch remains unchanged compared to the case shown in FIG. 2.

Code phase is corrected by the output from the new discriminator module which is fed through the lowpass filter $H_{corr}^d(z)$. Since the new module is less affected by multiple paths, the error contained in the code phase estimated in the DLL branch can be corrected to a large extent.

In a variant, the formula can be replaced by an amplitude function:

$$e_k = K_\beta \left( \lambda - \frac{|Z_k^{--}|}{|Z_k^-|} + S_\beta \right)$$

where $\lambda$ is a non-zero number lying between $-1$ and $+1$.

In another variant, the error signal $e_k$ may be determined by:

$$e_k = K_\beta \cdot \mathcal{R} \left( \frac{2 \cdot z_k^{--}}{z_k^- + z_k^+} + S_\beta \right)$$

Figure 5:
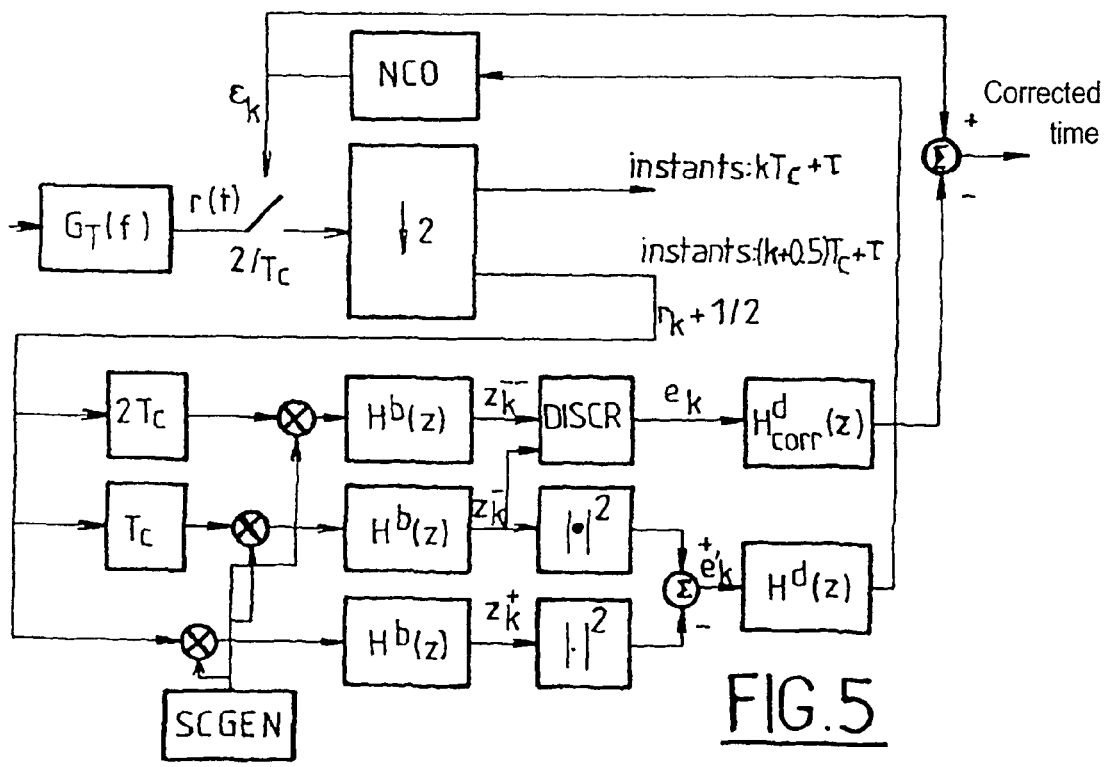
FIG. 5 is a block diagram of a DLL incorporating a conventional discriminator and a discriminator module of the present invention.

This expression is particularly suitable for open loop correction (FIG. 5). Because of the effect of averaging the outputs from the lowpass filters $(Z_k^- + Z_k^+)/2$, the noise power in the resulting variable is effectively halved, thus leading to less noise in the signal $e_k$.

It should be observed that the sampling instants $t_1 = 1.5$ and $t_2 = 0.5$ can have other values, and the difference $t_1 - t_2$ between these sampling instants could be other than one bit or "chip".

What is claimed is:

1. A multipath discriminator module for a communications and/or navigation system that implements spread spectrum modulation, wherein the module has an input suitable for receiving navigation signals, a sampler for supplying sampled signals at a frequency twice the apparent frequency (fc) of a code of said navigation signals, and a submodule for calculating an error signal ($e_k$) from said sampled signals ($r_{k+1/2}$), and a locally generated spreading code ($C_{|K|L}$) wherein:

$$e_k = K_\beta \mathcal{R} \left( \frac{Z_K^{--}}{Z_K^-} + S_\beta \right)$$

with $\begin{cases} Z_K^{--} = [r_{k-t2} \cdot C_{|K|L}] \otimes h_k^b \\ Z_K^{-} = [r_{k-t1} \cdot C_{|K|L}] \otimes h_k^b \end{cases}$ or $\begin{cases} Z_K^{--} = [r_k \cdot C_{|K-t2|L}] \otimes h_k^b \\ Z_K^{-} = [r_k \cdot C_{|K-t1|L}] \otimes h_k^b \end{cases}$ "$K_\beta$"=constant
"$h_k^b$" designating the impulse response of a lowpass filter
"$Z_K$" designating a signal sample
"$\mathcal{R}(x)$" designates a real portion of an operand x and $S_\beta = -\frac{g(-t1 Tc)}{g(-t2 Tc)}$ with $g(aTc) = \frac{\sin \Pi a \cos \Pi \beta a}{\pi a [1 - (2\beta a)]}$ "$\beta$" designating the attenuation factor of the SRC signal
"$S\beta$" is an offset
"$Tc$" designating a duration of one bit of a pseudo-noise sequence "$t1$" is a first sampling instant and
"$t2$" is a second sampling instant.

2. A multipath discriminator module for a communications and/or navigation system that implements spread spectrum modulation, wherein the module has an input suitable for receiving navigation signals, a sampler for supplying sampled signals at a frequency twice the apparent frequency (fc) of a code of said navigation signals, and a submodule for calculating an error signal ($e_k$) from said sampled signals ($r_{k+1/2}$), and a locally generated spreading code ($C_{|K|L}$) wherein:

$$e_k = K_\beta \left( \lambda - \frac{Z_K^{--}}{Z_K^-} + S_\beta \right)$$

"$\lambda$" lying in the range $-1$ to $+1$ with $\begin{cases} Z_K^{--} = [r_{k-t2} \cdot C_{|K|L}] \otimes h_k^b \\ Z_K^{-} = [r_{k-t1} \cdot C_{|K|L}] \otimes h_k^b \end{cases}$ or $\begin{cases} Z_K^{--} = [r_k \cdot C_{|K-t2|L}] \otimes h_k^b \\ Z_K^{-} = [r_k \cdot C_{|K-t1|L}] \otimes h_k^b \end{cases}$ "$K_\beta$"=constant
"$h_k^b$" designating the impulse response of a lowpass filter
"$Z_K$" designating a signal sample and $S_\beta = -\frac{g(-t1 Tc)}{g(-t2 Tc)}$ with $g(aTc) = \frac{\sin \Pi a \cos \Pi \beta a}{\pi a [1 - (2\beta a)]}$ "$\beta$" designating the attenuation factor of the SRC signal
"$S\beta$" is an offset
"$Tc$" designating a duration of one bit of a pseudo-noise sequence
"$t1$" is a first sampling instant and
"$t2$" is a second sampling instant.

3. A multipath discriminator module for a communications and/or navigation system that implements spread spectrum modulation, wherein the module has an input suitable for receiving navigation signals, a sampler for supplying sampled signals at a frequency twice the apparent frequency fc of a code of said navigation signals, and a submodule for calculating an error signal $e_k$ from said sampled signals ($r_{k+1/2}$), and a locally generated spreading code ($C_{|K|L}$) wherein:

$$e_k = K_\beta \, \mathcal{R} \left( 2 \frac{Z_K^-}{Z_K^- + Z_K^+} + S_\beta \right)$$

with $\begin{cases} Z_K^+ = [r_{k+0.5} \cdot C_{|K|L}] \otimes h_k^b \\ Z_K^- = [r_{k-t2} \cdot C_{|K|L}] \otimes h_k^b \\ Z_K^{--} = [r_{k-t1} \cdot C_{|K|L}] \otimes h_k^b \end{cases}$ -continued $$\text{or } \begin{cases} Z_K^+ = [r_k \cdot C_{|k+1/2|L}] \otimes h_k^b \\ Z_K = [r_k \cdot C_{(k-t2)L}] \otimes h_k^b \\ Z_k^- = [r_k \cdot C_{(k-t1)L}] \otimes h_k^b \end{cases}$$

"$\mathcal{R}(x)$" designates a real portion of an operand x
"$K_\beta$"=constant
"$h_k^b$" designating the impulse response of a lowpass filter
"$Z_K$" designating a signal sample $$\text{and } S_\beta = -\frac{g(-t1\,Tc)}{g(-t2Tc)}$$

$$\text{with } g(aTc) = \frac{\sin \Pi a \cos \Pi \beta a}{\pi a[1-(2\beta a)]}$$

"β" designating the attenuation factor of the SRC signal
"Sβ" is an offset
"Tc" designating a duration of one bit of a pseudo-noise sequence
"t1" is a first sampling instant and
"t2" is a second sampling instant.

4. A discriminator module according to claim 1, wherein:

$$K\beta = \frac{1}{\frac{d}{d\varepsilon}\left(\frac{g((\varepsilon - t1)Tc)}{g((\varepsilon - t2)Tc)}\right)_{\varepsilon=0}}$$

ϵ designating the code phase error.

5. A discriminator module according to claim 1, wherein t1−t2=1.

6. A discriminator module according to claim 5, wherein t1=1.5 and t2=0.5.

7. A navigation system, presenting a discriminator module according to claim 1.

8. A navigation system, presenting a discriminator module generating an error signal e'$_k$ serving in conventional manner to correct a closed loop on the basis of sampled signal Z+$_K$ and Z−$_K$ which is associated with a discriminator module according to claim 1 in order to generate in an open loop a correction signal for a code phase output.

* * * * *